(12) United States Patent
Winterling et al.

(10) Patent No.: US 7,579,989 B2
(45) Date of Patent: Aug. 25, 2009

(54) METHOD AND SYSTEM FOR EMITTER LOCALISATION

(75) Inventors: Gerhard Winterling, Holzkirchen (DE); Benjamin Benninghofen, Ottobrunn (DE)

(73) Assignee: EADS Deutschland GmbH, Ottobrunn (DE)

( * ) Notice: Subject to any disclaimer, the term of this patent is extended or adjusted under 35 U.S.C. 154(b) by 276 days.

(21) Appl. No.: 10/488,795

(22) PCT Filed: Sep. 3, 2002

(86) PCT No.: PCT/DE02/03238

§ 371 (c)(1),
(2), (4) Date: Nov. 2, 2004

(87) PCT Pub. No.: WO03/024050

PCT Pub. Date: Mar. 20, 2003

(65) Prior Publication Data

US 2005/0052315 A1    Mar. 10, 2005

(30) Foreign Application Priority Data

Sep. 5, 2001    (DE)    ................................ 101 43 561

(51) Int. Cl.
*G01S 3/02*    (2006.01)
*G01S 13/08*    (2006.01)

(52) U.S. Cl. ............................ 342/450; 342/50; 342/58; 342/60

(58) Field of Classification Search ................. 342/450, 342/417, 449, 387, 424, 465, 423, 458, 451, 342/457, 442, 443, 357.14, 357.08, 357.06, 342/444, 359, 462, 50, 58, 60

See application file for complete search history.

(56) References Cited

U.S. PATENT DOCUMENTS

| | | | | |
|---|---|---|---|---|
| 3,161,870 A | * | 12/1964 | Pincoffs | 342/59 |
| 4,040,054 A | * | 8/1977 | Overman | 342/13 |
| 4,393,382 A | * | 7/1983 | Jones | 342/458 |
| 4,621,267 A | * | 11/1986 | Wiley | 342/462 |
| 4,728,959 A | * | 3/1988 | Maloney et al. | 342/457 |
| 4,805,015 A | * | 2/1989 | Copeland | 348/48 |
| 4,806,936 A | * | 2/1989 | Williams et al. | 342/126 |

(Continued)

OTHER PUBLICATIONS

J. Ziegler et al. "MIDS triangulation a nd d e-ghosting of intersection points" Sensor Data Fusion and Integration of the Human Element (RTO-MP-12), Sep. 1998, pp. 11-1 through 11-8.

(Continued)

*Primary Examiner*—Thomas H Tarcza
*Assistant Examiner*—Nga X Nguyen
(74) *Attorney, Agent, or Firm*—Crowell & Moring LLP

(57) ABSTRACT

Process and system for the location of emitters in the radar frequency range on the basis of cross position-finding by at least two flying platforms with, in each case, at least one passive HF sensor for ascertaining the geometrical and electronic properties of the emitter beams, whereby the flying platforms mutually exchange data for describing the geometrical and electronic properties of the emitter beams, and whereby from the plurality of the position-finding beams' possible intersection points, which arise from the emitter surveying operation, use is made, in order to determine the emitter position, of those intersection points at which the electronic properties of the intersecting emitter beams are identical.

3 Claims, 6 Drawing Sheets

U.S. PATENT DOCUMENTS

| | | | | |
|---|---|---|---|---|
| 4,910,526 A | * | 3/1990 | Donnangelo et al. | 342/455 |
| 5,343,212 A | * | 8/1994 | Rose et al. | 342/424 |
| 5,389,936 A | * | 2/1995 | Alcock | 342/465 |
| 5,570,099 A | * | 10/1996 | DesJardins | 342/378 |
| 5,708,443 A | * | 1/1998 | Rose | 342/442 |
| 5,739,789 A | * | 4/1998 | Kronhamn | 342/465 |
| 5,914,687 A | * | 6/1999 | Rose | 342/442 |
| 5,920,279 A | * | 7/1999 | Andersson | 342/59 |
| 5,999,129 A | * | 12/1999 | Rose | 342/394 |
| 5,999,130 A | * | 12/1999 | Snow et al. | 342/457 |
| 6,061,018 A | * | 5/2000 | Sheynblat | 342/357.06 |
| 6,100,845 A | * | 8/2000 | Rose | 342/417 |
| 6,169,497 B1 | * | 1/2001 | Robert | 340/988 |
| 6,285,319 B1 | * | 9/2001 | Rose | 342/449 |
| 6,362,774 B1 | * | 3/2002 | Green | 342/59 |
| 6,407,703 B1 | * | 6/2002 | Minter et al. | 342/450 |
| 6,442,416 B1 | * | 8/2002 | Schultz | 600/429 |
| 6,489,922 B1 | * | 12/2002 | Lin et al. | 342/357.14 |
| 6,564,149 B2 | * | 5/2003 | Lai | 701/301 |
| 6,714,155 B1 | * | 3/2004 | Rose | 342/107 |
| 6,734,824 B2 | * | 5/2004 | Herman | 342/465 |
| 6,801,152 B1 | * | 10/2004 | Rose | 342/13 |
| 6,856,935 B1 | * | 2/2005 | Fehlis et al. | 702/152 |
| 6,933,888 B1 | * | 8/2005 | Schiffmiller et al. | 342/387 |
| 7,068,209 B2 | * | 6/2006 | Gounalis | 342/13 |
| 2003/0169202 A1 | * | 9/2003 | Krikorian et al. | 342/430 |
| 2004/0164902 A1 | * | 8/2004 | Karlsson et al. | 342/449 |
| 2004/0233100 A1 | * | 11/2004 | Dibble et al. | 342/357.06 |
| 2006/0114157 A1 | * | 6/2006 | Kolanek et al. | 342/424 |

OTHER PUBLICATIONS

K. Taubenberger et al, "Sensor fusion for modern fighter aircraft" Advanced Architectures for Aerospace Mission Systems (AGARD CP-581), Oct. 1996, pp. 28-1 through 28-7.

R. Grabau, "Radio communication and the waging (?) of electronic warfare", 1986, Frank'sche Verlagshandlung, W. Keller & Co., Stuttgart, pp. 337-343.

Canadian Office Action mailed Nov. 23, 2007.

* cited by examiner

METHOD AND SYSTEM FOR EMITTER LOCALISATION

BACKGROUND OF THE SUMMARY OF THE INVENTION

This application claims the priority of German Patent Document No. 101 43 561.4, filed 5 Sep. 2001, and PCT/DE02/03238, filed 3 Sep. 2002 the disclosure of which is expressly incorporated by reference herein, respectively.

The invention pertains to a process and a system for the location of emitters in the radar frequency range that is based on cross bearing (multi-platform triangulation) via airborne passive high frequency (RF) sensors.

Today, emitters in the radar frequency range are surveyed and located from a single airplane by means of continuous direction-finding and subsequent triangulation of the direction-finding beams. This method, however, has an insufficient accuracy in the case of emitters that are switched on briefly (with an emitting period of 15 seconds or less) and that are located at distances between the airplane and the emitter (greater) larger than approximately 25 km.

Processes have therefore been designed in which use is made of direction-finding beams from two airplanes that simultaneously intercept the same emitter. As a result of this, the transient triangulation base can be enlarged significantly so that it becomes possible even to locate emitters that are switched on only briefly.

This principle of position-finding by intersecting bearing lines is used, among other things, for locating flying objects via sensors that are stationed on the ground and that are spatially separated. Discussions and model calculations have been published in order to transfer this principle to flying platforms, whereby airborne emitters as well as ground emitters are surveyed and located with the help of multi-platform triangulation from several flying platforms. This principle was presented, for example, by K. Taubenberger and J. Ziegler in the lecture "Sensorfusion [sic] for Modern Fighter Aircraft" at the AGARD MSP Symposium "Advanced Architectures for Aerospace Mission Systems" in Istanbul, Turkey, Oct. 14-17, 1996, which was published in the AGARD Conference Proceedings AGARD CP-581 (obtainable via the Karlsruhe Technical Information Center, Eggenstein-Leopoldshafen).

Such multi-platform— triangulation can be used in the case that one or two emitters are in the area covered by the relevant sensors. In the case of many emitters in the covered area, however, this process of multi-platform-triangulation has the disadvantage that the number of geometrical intersection points is significantly higher than the number of real emitter positions.

In order to eliminate the very large number of "virtual" intersection points, the proposal is made in the lecture "MIDS Triangulation and De-ghosting of Intersection Points" by J. Ziegler and H. Sachsenhauser at the RTO SCI Symposium on "Sensor Data Fusion and Integration of the Human Element", Ottawa, Canada, Sep. 14-17, 1998, which was published in RTO MP-12, that all the intersection points be processed over a (longer) period of time in order to be able to evaluate whether, in terms of their geometrical and kinematic characteristics, they then behave as real emitter targets. Several credibility criteria are described in this publication for evaluation purposes, and various scenarios are examined in a model calculation.

A disadvantage with the use of this method is that, in the case of the occurrence of a large number of emitters, the number of intersection points increases as a function of $n^2$ with increasing the number n of emitter targets, and thus the requirements that are set for computer/processor performance increase very markedly. In the case that "emitter bearing lines" are only available transiently, on the other hand, the observation time is too short in many scenarios in order to be able to differentiate virtual intersection points reliably from a true target position. Thus in a scenario with several or many emmiters, which are switched on only briefly, the positions of the emitters cannot be determined unambiguously via this process, i.e., they can be only determined ambiguously.

Methods for signal processing and signal recognition have been disclosed in the publication "Radio communication and the waging of electronic warfare", R. Grabau, 1986, Frank'sche Verlagshandlung, W. Keller & Co., Stuttgart, ISBN 3-440-05667-8, pages 337 through 343. In this connection, the correlation of identical or similar signals is carried out in order to classify radar devices. The individually registered signal components/parameters of emmisions of radiation, which are possibly identical in frequency or of the same type, are assigned to different radiation sources by means of signal processing. It is required to find one pulse sequence of a radar device amongst all the pulse sequences that are registered in one searching process; in order to do this, the temporal sequence of the individual registered impulses is stored in a memory, and the time differences between the various pulses are measured, and the entire impulse sequence is examined using the temporal sequences that are obtained. If one or more uniform impulse sequences arise, then these parameters are subjected to further examination, or they are used directly for classification purposes. In another method, several test sequences of pulses are generated and correlated with every registered pulse sequence, whereby the number of agreements between the parameter values decides whether a particular parameter value is used for the purpose of classification. In the case of pattern analysis, the characterizing features of the individual elements in the registered sources are separated into signals, and then they are structured. In the case of signal recognition, segmentation takes place in order to recognize signals and portions of signals that are associated with one another.

A device to passively locate a distant radiation source via receiving antennae is disclosed in U.S. Pat. No. 4,393,382, whereby these antennae are arrayed in a spatial triangle in order to obtain measurable the various electrical signals generated by the received radiation; the angle of arrival is determined from these time differences. In turn, the distance of the radiation source from the receiving antennae is derived therefrom.

An airborne surveillance method and system is disclosed in U.S. Pat. No. 4,910,526 in which allows an observer airplane to ascertain the position and change of position of a plurality of target airplanes in which form part of a threat scenarion. Use is made of various factors for determining the position of the target airplane such as the particular elevation at which the airplane is flying and the time differences of signals of secondary surveillance radars. The Kalman filtering technique is used to a produce an estimate of the position of the target airplane on the basis of earlier measurements and to get an estimate of the error magnitude of each measurement. Incorrect values are thereby carried along in the process until a signal value is recognized as being incorrect on thebasis that the estimated value deviates from this signal value. This method results in a very complex and hence costly process.

An object of the invention is to provide a process on the basis of multi-platform-based triangulation in which even radar emitters that are switched on only briefly, i.e., over time spans of 3 to 15 seconds, can be localized unambiguously and with high accuracy via flying platforms.

An additional object for the invention is that such a process can be implemented with limited computation costs and with a limited inter-aircraft transmission rate in an airplane system even in the case of a that the number of intercepted emitters is greater than two per frequency band of the participating sensors.

In contrast to the inter-linking of ground-supported sensors, the data transmission rate between today's airplanes is limited; for example, this data transmission rate lies in the UHF range of currently approximately 0.2 to 1 Kbit/s in the case of an airplane/airplane data link; ODIN that is implemented in the ECR-TOR currently permits only one UHF data transmission in the manual operation mode. Even on a medium midterm timescale, an effective data rate of only 3 to 10 Kbit/s can be expected with the installation of new UHF communication devices.

In accordance with the invention, the geometrical emitter beam data, such as the position of the airplane at the point in time of surveying the emitter and the azimuthal angle at which the emitter is surveyed, are exchanged between the participating platforms for the purpose of emitter localization. The angle of elevation, the azimuthal angle measurement error, and/or the point in time of intercepting the emitter are also optionally exchangeable.

Properties that describe the important characteristic features of the intercepted RF signal and its temporal profile are also transferred between the platforms.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
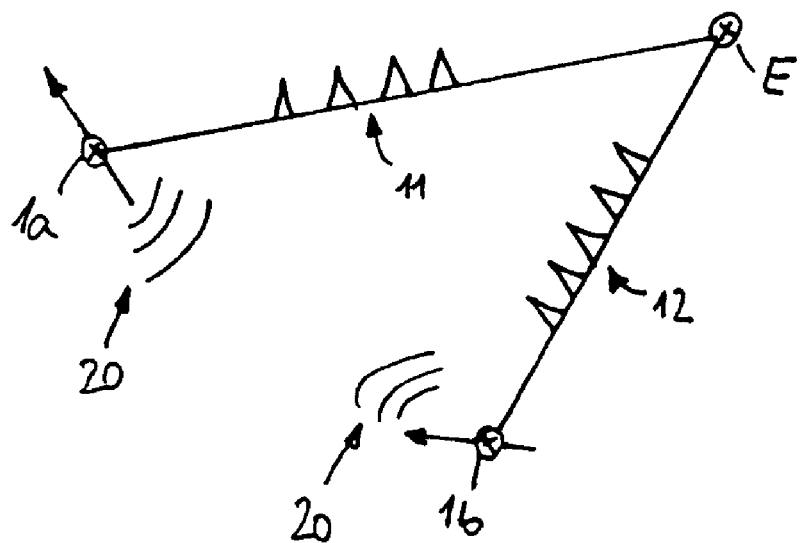
FIG. 1, by way of example, shows a constellation with two flying platforms for accommodating the system in accordance with the invention as part of a military force package and with a schematic representation of the pulse sequences that are sent out by an enemy emitter, whereby the platforms use the process in accordance with the invention in order to detect and localize the emitters in the radar frequency range on the basis of cross bearing via passive RF sensors that have been integrated into the platforms or the flying devices, respectively.

Employment of the invention is envisaged in a configuration of at least two flying platforms implementing the system or process in accordance with the invention, whereby the flying platforms can be manned or unmanned flying vehicles. Such a constellation is illustrated in FIG. 1 by means of a first flying platform or a first flying device or airplane 1a, and by means of a second flying platform or a second flying device or airplane 1b. Flying platforms 1a, 1b (and optionally additional flying platforms 1c: see FIG. 7) are components of a military operational formation and have the task of detecting and locating enemy emitters, in the radar frequency range, on the basis of cross bearing via passive RF sensors that are integrated into the platforms or flying vehicles. By way of example, such an enemy emitter E is illustrated in FIG. 1.

Figure 2:
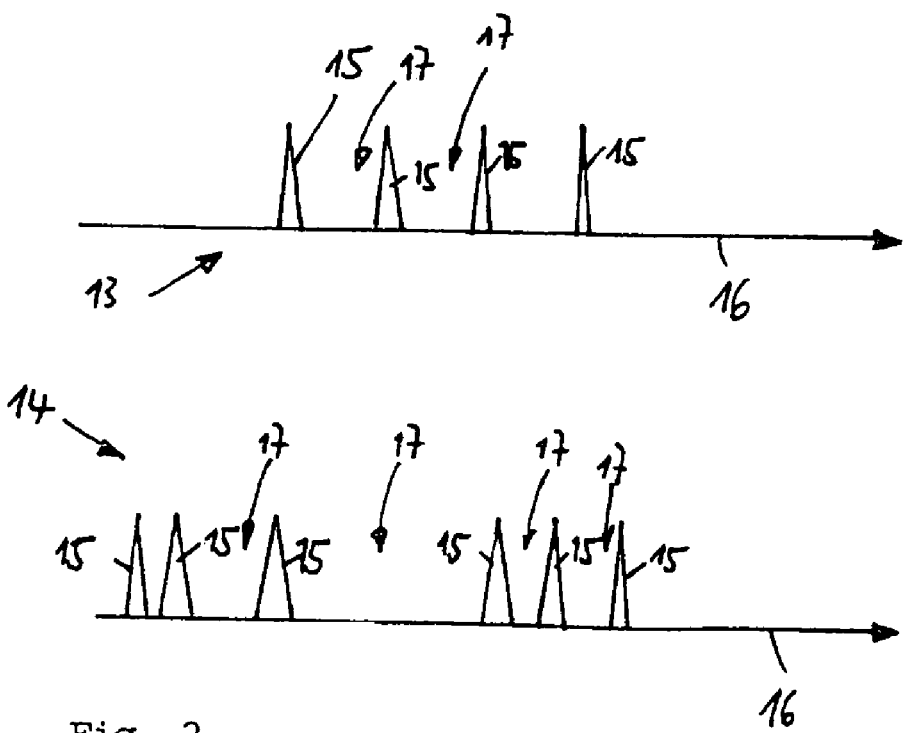
FIG. 2 schematically shows pulse sequences of an emitter that is to be detected, illustrating the temporal profile of the emitter signal.

Emitter E sends out pulse sequences in the radar frequency range, whereby two pulse sequences 11, 12 are symbolically illustrated in FIG. 1. A first pulse sequence 11 is received by platform 1a, and a second pulse sequence 12 is received by platform 1b. Two examples 13, 14 of such sequences of pulses 15 are illustrated in FIG. 2 on a time scale 16. Pulse sequence 13 shows a sequence of pulses with constant time intervals 17 between pulses 15. In contrast to this, pulse sequence 14 exhibits different time intervals 17 between individual pulses 15. In general, the sequences of pulses that are sent out can be variable with regard to time intervals 17 between pulses 15 and also in regard to the intensity of the pulses. In general platforms 1a, 1b r intercept the pulse sequences, which are sent out by emitters E, only during limited time intervals since, generally, the RF sensor measures sequentially, and not simultaneously, in several frequency bands.

Figure 3:
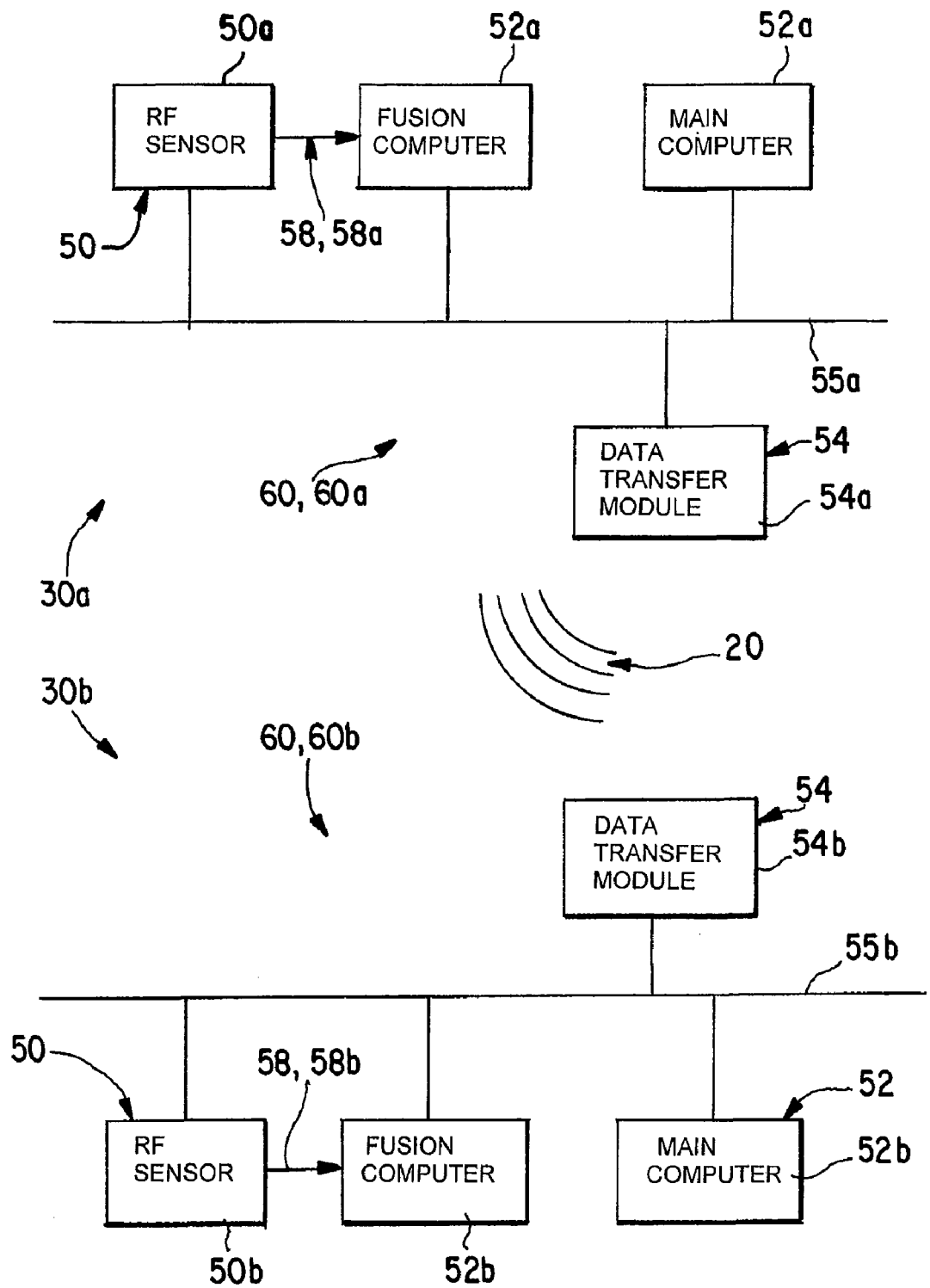
FIG. 3, by way of example, shows the relevant components of the avionics systems of a first and a second flying platform with which constitute the emitter location system in accordance with the invention and which intercept the emitter signals and are relevant for communicating between the platforms.

Platforms 1a, 1b are in radio contact with one another for at least part of the time, whereby this radio contact has been drawn in symbolically in FIGS. 1 and 3 and has been provided with the reference number 20. This radio communication involves the automated communication of data. In a first form of embodiment of the invention, this communication of data is bi-directional, i.e., platforms 1a, 1b have equal status from the technical communication standpoint, and both operate as masters. In an alternative form of embodiment of the invention, one platform can operate as the master and the other as the slave, whereby data transfer then takes place only uni-directionally from the "slave" platform to the "master" platform. The present invention's emitter location system, which involves the transfer of relevant data between at least two platforms, can also be configured in such a way that, even during use, it is capable of being switched from the mode "communication between platforms of equal status" to the master/slave communication mode. The advantage of master/slave communication can be found in an increase of the effective rate of data transfer relative to communication between platforms of equal status.

The invention is implemented in an avionics system 30 of a flying platform. By way of example, FIG. 3 shows the relevant components of an avionics system 30a of a first platform 1a, and those of an avionics system 30b of a second platform 1b. First platform 1a has a data transfer module 54a, and second platform 1b has a data transfer module 54b that are implemented, in each platform, to transmit and/or to receive data in the UHF range. Using these, the two avionics systems 54, 54a or, 54b, respectively, are capable of communicating with one another. In addition, first platform 1a has an RF sensor 50a, a fusion computer 52a, a data bus 55a and, optionally, a main computer 57a; in a corresponding manner, second platform 1b has an RF sensor 50b, a fusion computer 52b, a data bus 55b, and a main computer 57b. The fusion computers 52a or 52b, the data buses 55a and 55b and the RF sensors 50a and 50b, respectively, form the multi-platform emitter location system 60. The modules that have been described could be realized on the hardware level in various forms, and they could operate in various ways. Main computers 57a or 57b can have the function of a bus controller in order to functionally link the modules that are connected to data buses 55a, 55b. At least one additional internal bus 58a or 58b can be provided for establishing high speed communication especially between the RF sensor 50 and fusion computer 52.

Data transfer modules 54a, 54b supply data that are suitable for multi-platform correlation, so that these data are sent via avionics bus 55a 55b or optionally additional via internal bus 58, to other components of the avionics system 30a or 30b for processing by these data. In the case of multi-platform-based correlation, at least two avionics systems 30a, 30b of the different platforms 1a, 1b act together in order to correlate the data, which are provided by relevant assigned RF sensors 50a or 50b, from at least one emitter E, and hence to localize unambiguously emitter E in question. For this purpose, the data transfer modules 54a, 54b preferably have an automation circuit, which—after receiving a message via avionics buses 55a, 55b—triggers the automated transmission of the UHF message that is then received by the data transfer module of the communicating platforms.

Fusion computer 52 of platforms 1a, 1b, which are communicating with one another, can have a communication control unit by means of which the type of communication, i.e., equal status communication or master/slave communication for example, is carried out and can optionally be configured or selected.

Figure 4:
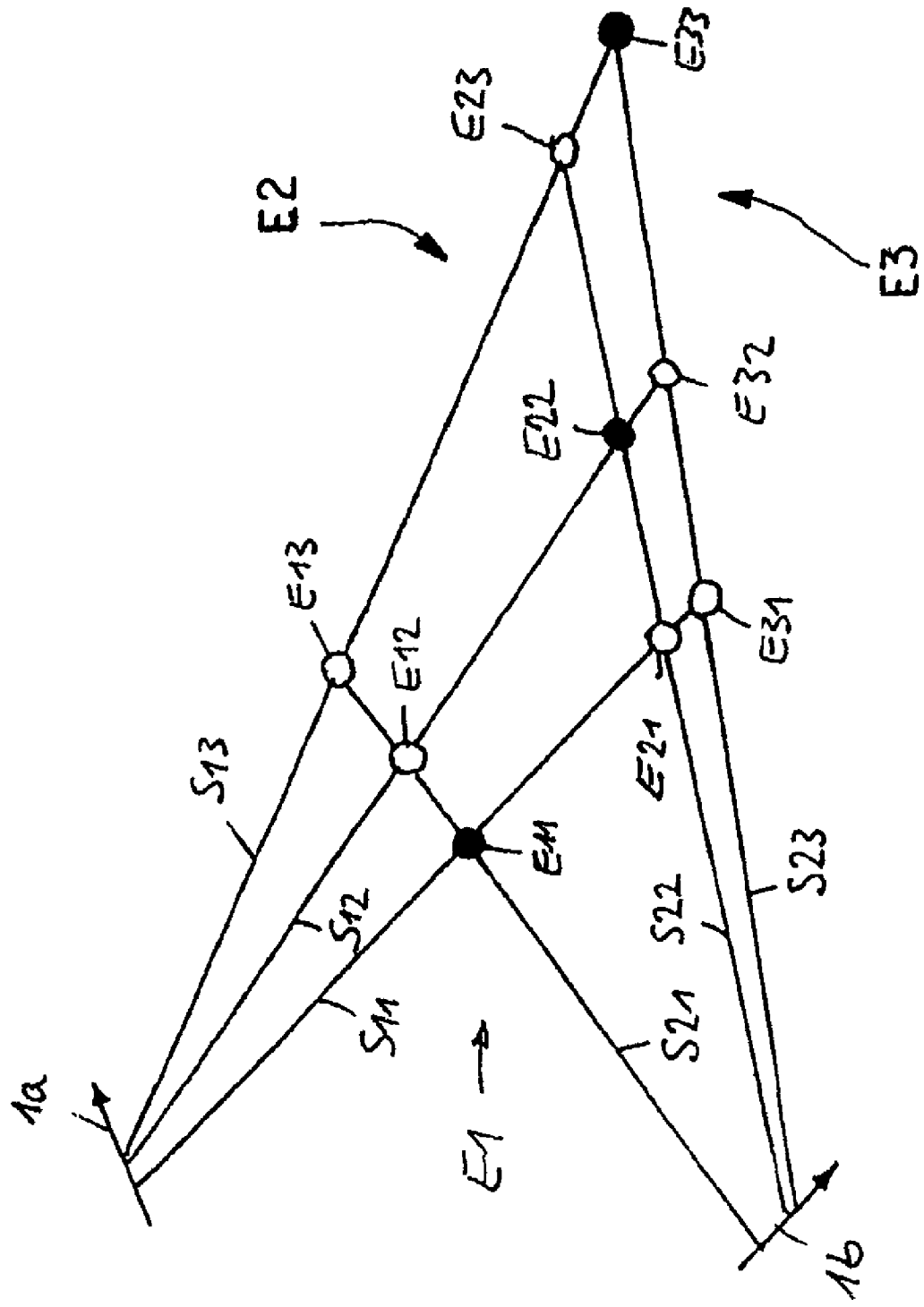
FIG. 4 shows a constellation of two platforms and three emitters in order to derivation from the signals by means of passive RF sensors, whereby these intersection points arise from intersecting the bearing lines/emitter beams that are derived from the intercepted signals of the enemy emitters.

A constellation of two platforms 1a, 1b with flight directions indicated by the relevant arrows and three real emitters E1, E2, E3 are illustrated in FIG. 4. Platforms 1a, 1b receive signals from emitters E1, E2 and E3; from these received signals, the platforms then determine the direction of the emitter relative to the measuring platform. Accordingly, beams S11, S12 and S13, which platform 1a has surveyed, have been entered, in FIG. 4, for platform 1a, along with beams S21, S22 and S23 that platform 1b has surveyed. The intersection points of these beams are possible positions for emitters E1, E2, E3. A total of nine possible geometrical intersection points result. Thus the number of intersection points is significantly higher than the number (three) of actual emitter positions. Seen from platform 1b, locations E11, E12, E13 arise as possible positions for first emitter E1; possible positions E21, E22, E23 arise for second emitter E2; and possible positions E31, E32, E33 arise for third emitter E3. It can readily be seen that unambiguous assignment of emitter locations E1, E2 and E3 is not possible on the basis of solely exchanging direction information between the two platforms 1a, 1b.

In accordance with the invention, this ambiguity with regard to the determination of the positions of emitter locations E1, E2 and E3 is eliminated by way that electronic properties of the intercepted signals, i.e. the pulse sequences 11, 12, are exchanged between the platforms in addition to data describing the direction information. The intersection points that are emitter-relevant are selected from the plurality of possible geometrical intersection points by correlating the electronic properties, whereby the electronic properties of the intersecting beams are identical at these selected intersection points.

In the example of FIG. 4, beams S11 and S21 have identical electronic properties and, accordingly, intersection point E11 is the real position of emitter E1. Analogously, the real positions of the emitters E2 and E3 arise from E22 and E33, respectively. As a result of exchanging these electronic properties, it is possible, in principle, to eliminate virtual intersection points from the plurality of geometrical intersection points and to filter out the real emitter positions after just one direction finding or surveying measurement. In contrast to the current state of the art, this is particularly useful in the case of a large number of emitters or platforms, and it can effectively reduce ambiguities when locating emitters that are switched on transiently.

Two or three direction-finding measurements are advantageously awaited by each platform 1a, 1b before the filtered emitter positions—i.e., the emitter positions that have been ascertained by comparing the electronic properties of the emitter beams—are declared to be surveyed emitter positions, whereby, in the case of manned platforms, these filtered emitter positions are also displayed as emitter positions that have already been surveyed. As a result of this, one can eliminate virtual positions that are produced by secondary beams, e.g., by ground reflections.

In accordance with the invention, the following electronic properties of the emitter beams are ascertained and exchanged between the platforms in order to determine emitter positions:

the measured frequency of the emitter signals that are intercepted/received;
the time differences 17 between each of two (sequential) succeeding pulses 15 of the pulse sequence 13 or 14 respectively that is received;
a short signal, which has been agreed between the platforms 1a, 1b that are communicating with one another, that classifies the sequence of the time differences of the pulse sequence that has been surveyed.

Optionally, the following electronic properties of the emitter beams can also be ascertained and exchanged between the platforms in order to improve the correlation process for locating emitters on the basis of a comparison of the received emitter signal's characteristic features:

the pulse duration of the pulse sequence 13 that is received/ intercepted;
the measured frequency width, or the minimal and maximal frequency value in the case of frequency-agile emitters;
the polarization of the signal that is received, whereby this is especially advantageous in cases of denser scenarios for which the signal direction-finding line correlation can be exploited;
the measured average intensity of the emitter signal that is intercepted registered.

In order to determine emitter positions, use is optionally made, in accordance with the invention, of at least one of the above designated electronic properties in addition to the measured frequency, the time differences between each of two succeeding pulses, and a signal for the sequence of time differences for the pulse sequence that is being surveyed, whereby, in addition, several of these can optionally be utilized for determining the position, however.

As a result of the solution in accordance with the invention, namely describing the important properties of the registered fragments of an entire emitter pulse sequence, and transferring the characterizing data for these properties between the platforms, the direct assignment of the registered signals to a particular emitter is not required. In order to characterize an emitter via a code, it would otherwise be necessary that adequate pre-knowledge (information) be known regarding the trains of pulse sequences to be surveyed and the characterizing emitter parameters, which are associated therewith, at the time of usage and hence at the instant of registering the emitter signatures. Only with this pre-knowledge the properties of the emitter signals, which have been stored in a data library, can be assigned to additional signals that are later received. such pre-knowledge, however, is frequently not available in most operational cases since the signal parameters can be altered several times in the course of a day so that characterization of the emitters via a previously agreed code has only limited relevance in practice. Moreover, unambiguous identification of emitter signals in the case of emitters that are switched on only briefly is rendered difficult by the fact that the RF sensors, which scan a multitude of frequency bands, register the emitters via measurement times that are distinctly shorter than the emission times of these emitters. Frequently, only fragments of an entire emitter pulse sequence are then available at the sensor exit so that usage, in accordance with the invention, of the designated data characterizing electronic properties of the emitter signals permits emitter classification even in the case of more complex signal forms and of brief emission times.

In order to correlate the electronic properties of the emitter signals, the pulse trains, which are received by platform 1a, 1b, are sorted in accordance with the frequency windows or frequency bands, whereby the width of the frequency bands depends on the operational case (in question) and also on the properties of the participating RF sensors.

The transfer of additional emitter properties becomes unnecessary in one case of using the invention in which only one emitter is registered/intercepted in the frequency window in question. In the general case, however, several emitters are registered/intercepted in one frequency window so that, in accordance with the invention, the additional (optional) properties of the signal are exchanged in order to eliminate ambiguities.

The quantity of data to be transferred increases with increasing numbers of emitters that are located in the field of regard of sensors 50, 50a, 50b of receiving platforms 1a, 1b, and, in the case of a high density of emitters, this quantity would possibly exceed the maximum data rate for the implemented data link. In accordance with the invention, and especially in the case of a high emitter density, the quantity of data that is being transferred can be reduced further and it can be adapted to the limitations of current data links by way of the feature that both the geometrical data and the data characterizing electronic properties of signals received from emitters that have become newly active (operational), are transferred with higher priority, and the data of emitters, which have already been surveyed, are transferred with subordinate priority. Depending on the priority, an appropriate repetition rate is then provided for transferring the data characterizing the electronic properties of the emitter signals.

In this way, the emitter signals or the direction-finding beams, respectively, are sorted as follows for the transmission task:

beams, which do not pass through emitter positions that are already known, are immediately transferred between the platforms via the next two RF data packets, whereas beams, which can be assigned to emitter positions that are already known or that have already been surveyed, are then transferred in subsequent data packets only when the signals or beams, which were received thereafter, have led, in the correlation, to the unambiguous location of the emitters that have become newly operational.

In the case of a limited data transfer rate, it is possible, using this process, to rapidly establish an updated electronic order of battle which equals the image of the emitter positions, even in a scenario with a higher emitter density, by means of a "multi-aircraft" correlation and to display this to the crew, in the case of manned airplanes.

The electronic emitter parameters can be characterized via a code in order to further reduce the quantity of data to be transferred, whereby this code describes the emitter identification by means of a short signal that is known to the operational formation and that has been stored in the data bank/ library. In this way, only this code is transferred together with the designated geometrical data characterizing the emitter beams.

In order to use the emitter location process in accordance with the invention for emitters with complex signals/pulse sequences:

In accordance with the invention, temporal synchronization/frequency-harmonization of the frequency bands of participating airplane sensors 50a, 50b is provided. As a result of this, the instants $t_1$ and $t_2$ in which the RF sensors of the participating airplanes take measurements do not differ in the frequency band of the emitter that is being registered. In the case of emitters with complex pulse sequences (compare FIG. 5), and in the case of frequency-agile emitters (compare FIG. 6), these procedures avoid the problems that arise when the pulse repetition intervals and/or the emitter frequency—are modulated over an time period that is significantly longer than the (measurement) dwell time in a frequency band.

Figure 5:
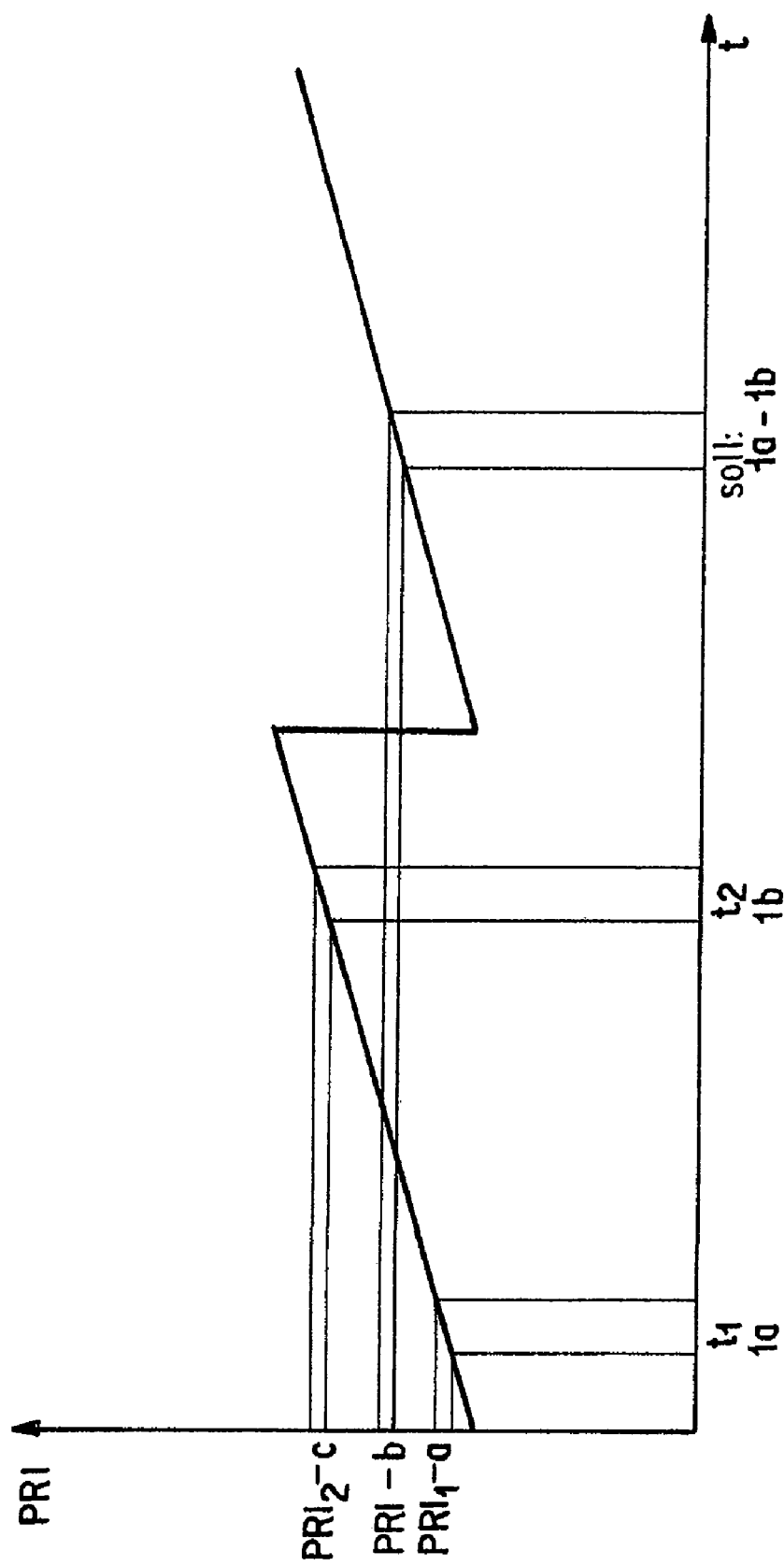
FIG. 5 shows the temporal profile of the time difference pulse repetition interval between two sequential pulses from the enemy emitter, e.g., in the case where this time difference is periodically switched between three values.

As will be explained in detail in the following section, these problems do arise in the case of processes in accordance with the prior art. FIG. 5 shows the time interval t between two sequential emitter pulses displayed on the vertical axis of FIG. 5.

After a time $t_{int}$, which can comprise 10 to 50 emitter pulses for example, the PRI value is switched from PRI-a to the higher value PRI-b and then, after a further interval of time, to the next value PRI-c. After these three switching intervals, modulation of the PRI values can be repeated in the way as illustrated, for example, in FIG. 5. Since, in accordance with the prior art, the frequency dwell bands of the participating HF sensors have not been synchronized in time. The RF sensors of the participating prior art airplanes therefore asynchronously survey the frequency band or (in the case of frequency-alert emitters) the frequency bands in which the emitter is radiating. Accordingly, measurement times $t_1$ and $t_2$ of platforms 1a and 1b have been entered differently in FIG. 5. In the situation that frequently arises in the case of complex emitters, whereby the switching time $t_{int}$ of the pulse repetition interval PRI is longer than the duration of the dwell time $\Delta t_{me\beta}$ (see FIG. 5), sensor 50a on platform 1a will register a PRI value at the instant $t_1$, namely PRI-a, which differs from the value registered by sensor 50b of platform 1b which measures PRI-c at instant $t_2$. After a (dwell) repetition or revisit time $t_{wi}$, which is dependent, among other things, on the ratio of the frequency width of the momentary measurement window relative to the entire frequency range in which the RF sensor can intercept the emitter beams, the RF sensor repeats the emitter measurement in the appropriate frequency measurement window (dwell band). In the case of the processes in accordance with the prior art, repeat time $t_{wi}$ can vary from platform to platform, i.e., it can depend on the functional design of the avionics system in question. In the case of very sensitive RF sensors, the frequency band of the measurement window is usually significantly smaller or narrower than the entire frequency range of the sensor and, accordingly, repeat time $t_{wi}$ is significantly longer than the duration $\Delta t_{me\beta}$ of the measurement in a frequency band. In this way, $t_{wi}$ can usually have values in the range from approximately 1 to 3 seconds. Thus, in the case of processes in accordance with the prior art, the situation can arise with emitters with a pulse sequence corresponding to the example that is outlined in FIG. 5 that not only platforms 1a and 1b do measure different PRI values, but that, during the second surveying (operation) measurement, the value PRI-a is no longer measured on platform 1a, either, but rather the value PRI-b is measured. A corresponding state of affairs applies to the sensor on platform 1b. Thus, in the case of the prior art, the situation can arise with emitters having more complex pulse sequences in accordance with the example that is described by means of FIG. 5, that different instantaneous electronic characterizing data from one and the same emitter, such as the pulse repetition interval PRI of two sequential pulses, are surveyed by platform 1a and platform 1b. For this reason, rapid assignment (correlation) of the direction-finding beams (from platform 1a and 1b) on the basis of data characterizing electronic properties is made very difficult in accordance with the prior art, and it is usually not possible for emitters of greater complexity. It is only after more frequent repetition of the measurement in the relevant frequency band (or various frequency bands in the case of highly frequency-agile emitters) that an adequate number of pulses are registered so that an unambiguous classification of the signal, or the pulse sequence, respectively, has become feasible even in the case of a complex and longer pulse sequence. The direction-finding beams, which correspond to one another, can then be assigned (correlated) via the that "electronic" classification. Using this process, ambiguities during the location procedure can finally be eliminated even in the case of several similar emitters, although at the expense of a longer measurement time. In the case of several complex emitters in the fields of regard, the processes in accordance with the prior art yield unambiguous results only if the emitter radiate for a longer time.

The localization of more complex emitters by means of multi-platform triangulation (via passive RF sensors) is accelerated in accordance with the invention by way of the feature that the RF sensors of the participating aircraft are induced to measure the same frequency window at the same time. This concurrence (or synchronization) is achieved, for example, by way of the feature that each of the two airplanes have at their disposal a timer with the same time. Accuracy of the order of approximately 0.1 msec is adequate for the purposes of use in accordance with the invention. Such accuracy can be achieved via the use of a satellite navigation system and/or with the help of a data link to an external timer. An agreement is then made between the participating airplanes that selected frequency bands shall be surveyed at defined times, which are repeated periodically, and for a predetermined period of time.

Figure 7:
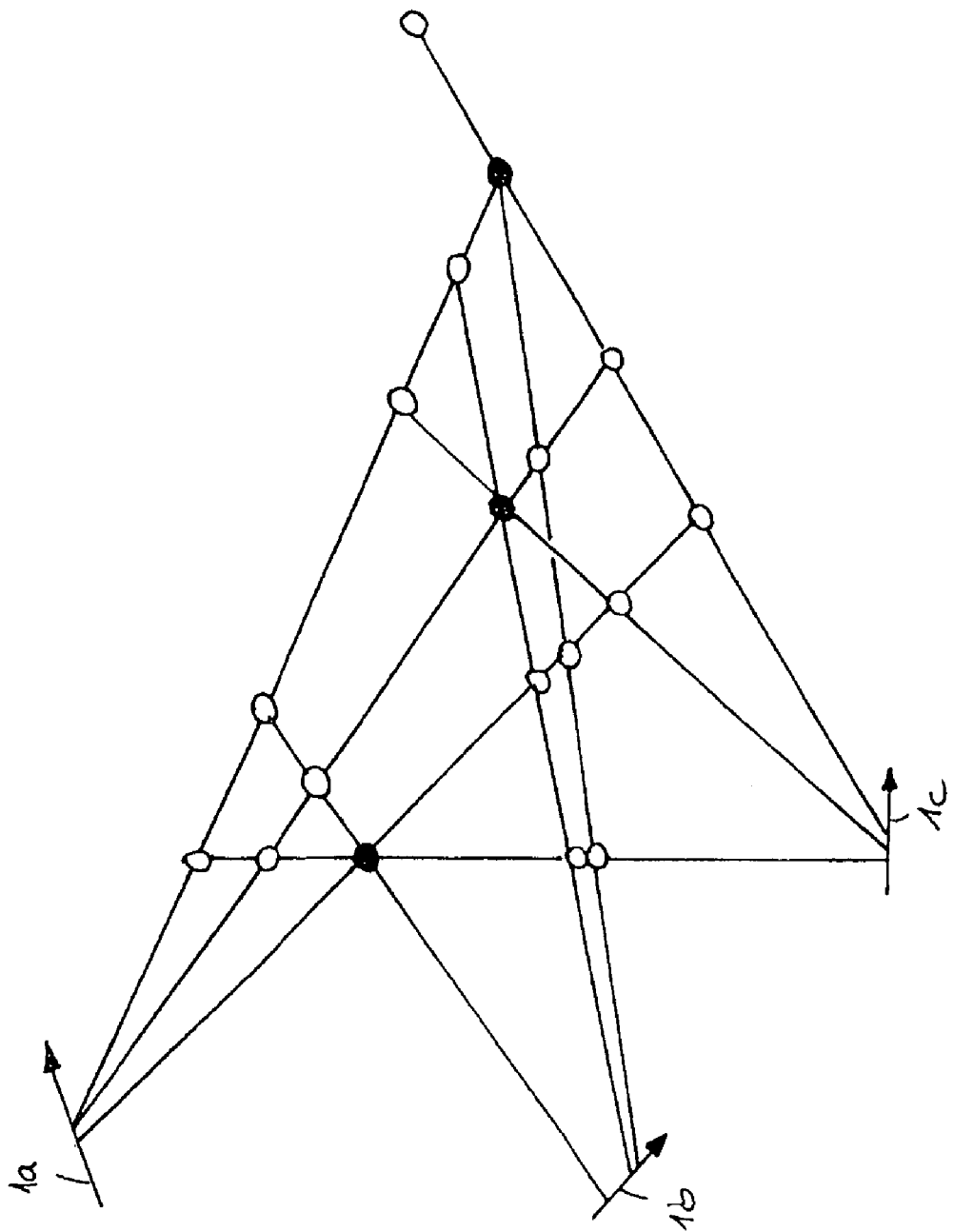
FIG. 7 shows, by way of example, the bearing beams from three flying platforms in the case of three emitters in the field of view of the RF sensors, whereby the number of virtual intersection points is significantly greater than the number of emitter positions.

If the frequency bands (of the RF sensors) are now synchronized between the participating platforms, and if the surveying of the emitters takes place approximately at the same time in the participating airplanes, then the bearing lines, which are surveyed by the participating airplanes, are assigned (correlated) in a "correct manner appropriate for the emitter" even in the case of emitters with more complex signals or pulsed sequences. In this way, the assignment problems that are described in e.g., FIG. 7 are avoided during the registration of several emitters. Airborne emitters, even if switched on only briefly, can also be tracked in a passive way, that capability is in general not feasible with the current prior art.

Figure 6:
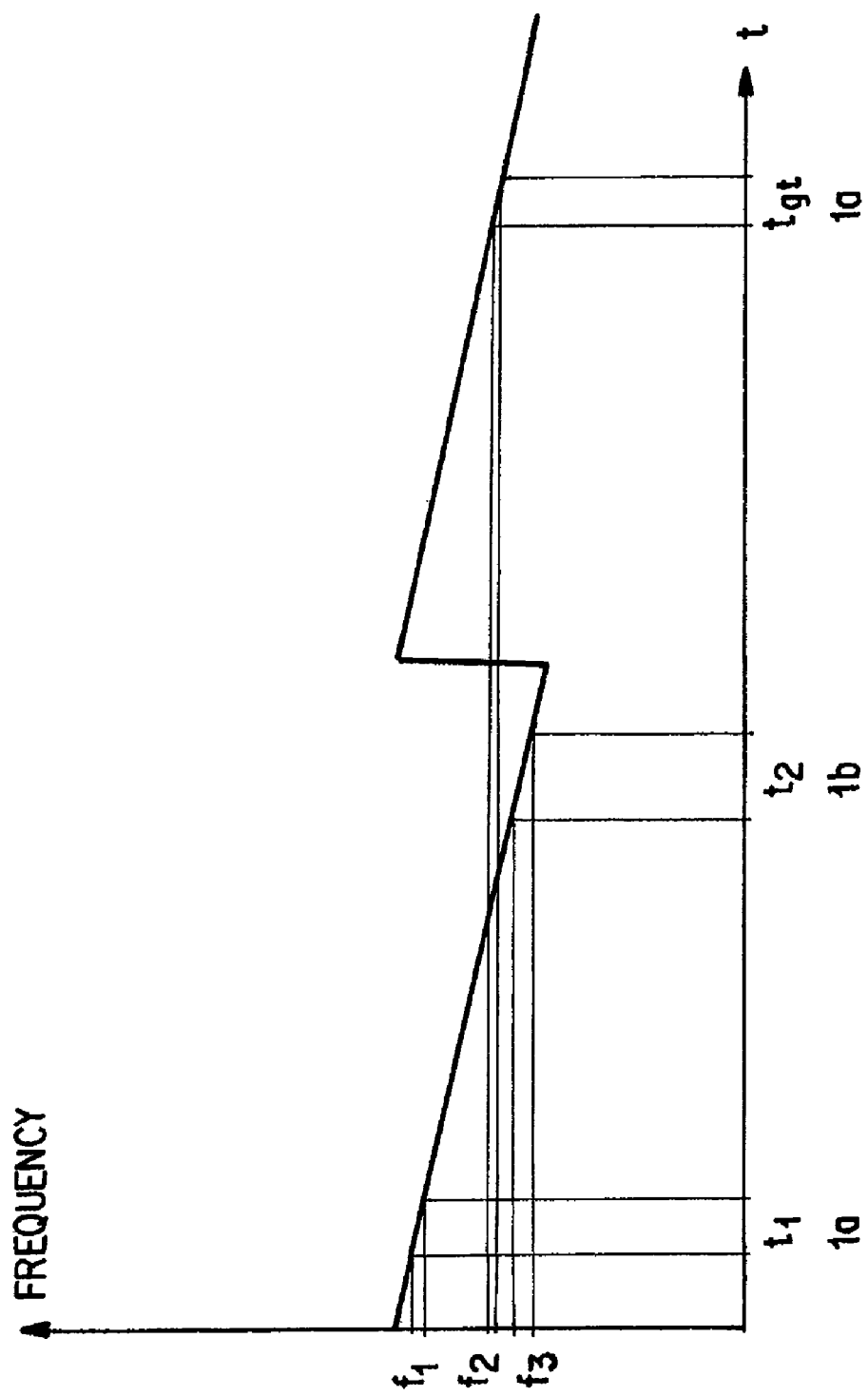
FIG. 6 shows the temporal profile of a momentary instantaneous emitter frequency, e.g., in the case where the frequency is periodically switched between 3 values.

The problem area with regard to assigning (correlating) frequency-agile emitters is illustrated in FIG. 6 in accordance with the current prior art. FIG. 6 shows the momentary emitter frequency for the case of an emitter where the frequency is switched from a value $f_1$ to a value $f_2$ after a time interval $t_{int}$ and then to a value $f_3$ after a further interval of time. The frequency sequence can be repeated after these three switching intervals. In accordance with the prior art, the times $t_1$ and $t_2$, at which the participating platforms ECR1 and ECR2 carry out measurements for a period of time $\Delta t_{me\beta}$, are generally different. As illustrated in FIG. 6, the momentary frequencies which are then measured, are $f_1$ by platform 1a, and $f_2$ by platform 1b. The assignment of the corresponding bearing lines is then difficult on the basis of the surveyed (electronic) frequency, and it can lead to ambiguities in the case of several emitters that are being registered in one frequency band when using multi-platform-triangulation.

In accordance with the invention, by contrast, the frequency measurement windows of the two airplanes are synchronized so that the measurement takes place, in one frequency band, at the same time $t_{gt}$ on the two platforms. As a result of this, the same "momentary" frequency $f_2$ is measured by both platforms 1a, 1b.

In this way, the direction-finding beams can be assigned (correlated) on the basis of the "momentary" electronic frequency in the surveyed time interval even if, in the case of the more complex pulse sequences, an unambiguous electronic identification of the emitters is not yet possible or correspondingly an electronic identification is possible only with ambiguities because of the limited number of pulses per frequency measurement window. The temporal synchronization of the frequency measurement windows is especially helpful in the case of locating popping up emitters (which have previously been silent) when these are PRI-agile and frequency-agile and emitting only for a brief period: in that case the same "momentary" electronic signature is then seen by the two platforms due to the temporal synchronisation.

If several similar emitters (e.g., two threatening radars of the same type and one decoy radar, which have approximately the same frequency or the frequency differences are not resolvable by the RF sensor) are in the field of view of the RF sensors, then the following situation can arise in accordance with the current prior art: even after two bearing measurements, the bearing lines cannot yet be assigned, on the basis of the surveyed electronic parameters or if they are assigned then only ambiguously.

If more than two platforms, which intercept and survey the radiating emitters, are present in the scenario, then this can advantageously be exploited for the more rapid elimination of virtual intersection points during cooperative location finding.

The solution, in accordance with the invention, in the case of three intercepted emitters in the field of view of three platforms 1a, 1b and 1c is illustrated schematically in FIG. 7. Each of these three platforms provides at least three direction-finding beams that originate from three emitters that are being registered. As a result of this, significantly more geometrical intersection points than the true emitter positions arise via the intersection of the direction—finding beams which amount to nine in total. In FIG. 7, the virtual intersection points are represented by open circles, and the true emitter positions are represented by filled circles. The real emitter positions now generally coincide with the triple intersection points, whereas the virtual intersection points are distinguished by the fact that only two bearing lines intersect here. The virtual intersection points can be excluded by eliminating the "pair-wise intersection points" without the necessity that the electronic signal properties have to be known in detail, as it is the case of only two participating platforms as discussed above. Thus the virtual intersection points will differ from the true emitter positions by way of the feature that the highest priority is assigned to the triple intersection points, and subsidiary priority is assigned to the pair-wise intersection points.

This process for the elimination of virtual intersection points can advantageously be used in the case of stationary emitters, especially when the RF sensors are sensitive enough to intercept the side lobes of the emitters as well. This is important when registering tracking radars that usually radiate their main lobes only in a smaller range of solid angles. In the case of airborne emitters, this process in accordance with the invention is advantageously employed using three or more platforms, in particular, when (as described above) there has been agreement between the participating platforms that the registering RF sensors will be simultaneously measuring in the same frequency band.

Summarizing, a process has been provided, in accordance with the invention, for the location of emitters in the radar frequency range on the basis of cross position-finding by at least two flying platforms with, in each case, at least one passive RF sensor in order to ascertain the emitter beam properties, whereby, in order to determine the geometrical properties of the emitter beams, the flying platforms mutually exchange the airplane position at the instant of surveying the emitter and the azimuthal angle at which the emitter is surveyed, whereby an exchange also takes place of the measured frequency of the intercepted emitter signals, and the time differences 17 between, in each case, two sequential pulses 15 of the pulse sequence 13 that is received, along with a signal for classifying the sequence of time differences of the pulse sequence that is being surveyed, and whereby, in order to determine the emitter position, amongst the plurality of possible intersection points of the direction-finding beams arising from the emitter surveying measurement, use is made of those intersection points at which the electronic properties of the intersecting emitter beams (or bearing lines) are identical. In addition, the pulse duration of received pulse sequence 13 of the emitter, and/or the measured frequency width or the minimum and maximum frequency value of received pulse sequence 13 of the emitter, and/or the polarization of the received signal of received pulse sequence 13 of the emitter, and/or the measured average intensity of received pulse sequence (13) of the emitter can be exchanged between platforms 1a, 1b.

During the process for locating emitters, the electronic emitter parameters can be encoded using a code describing the emitter identification via a brief signal that is known to the operational (formation) squadron and that has been stored in a data (bank) library. Moreover, the frequency (measurement windows) bands, which are used by platforms 1a, 1b, can be synchronized between the platforms, and the surveying measurement of the emitters can take place in the participating airplanes simultaneously. In an additional form of embodiment of the process in accordance with the invention, the frequency measurement windows of two platforms 1a, 1b can be synchronized so that the measurement takes place, in one frequency band, at the same time $t_{gt}$ on the two platforms in order to measure the same momentary frequency $f_2$ on platforms 1a, 1b.

In accordance with the invention, the process can be implemented in the emitter location system of flying platform 1a in order to locate emitters via cross bearing by means of RF sensor 50a, which can receive data from RF sensor 50b from additional flying platform 1b, via data transfer module 54a, in order to describe the properties of the emitter beams in order to carry out a process in accordance with one of the claims described below.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A process for locating emitters in a radar frequency range, comprising:

providing at least two flying platforms each including at least one passive radio frequency sensor for determining emitter beam pulse sequences;

mutually exchanging positions of the at least two flying platforms while surveying the emitters and the azimuth angle in which each emitter is being surveyed;

exchanging electronic properties of received emitter beams between the platforms, including a measured frequency of the emitter beams that are intercepted, time differences between each instance of two sequential pulses of an intercepted pulse sequence, and a signal for classifying a sequence of time differences of a pulse sequence being surveyed; and determining an emitter location by using intersecting points at which the electronic properties of the intersecting emitter beams are identical from among a plurality of possible intersecting points arising from intersecting bearing lines obtained during said emitter surveying, wherein geometrical data and electronic characterizing data for the emitter signals, which are received from emitters that have become newly operational, are transferred with a first priority, and the data for emitters, which have already been surveyed, are transferred with a second priority lower than the first priority and, depending on the priority, an appropriate repetition rate is provided for the transfer of the electronic characterizing data for the emitter signals during the exchange between said at least two platforms, and wherein frequency measurement windows, which are used by said at least two platforms, are synchronized between said at least two platforms to correlate the electronic properties, and surveying of the emitters takes place simultaneously in said at least two platforms.

2. A process for locating emitters in a radar frequency range, comprising:

providing at least two flying platforms each including at least one passive radio frequency sensor for determining emitter beam pulse sequences;

mutually exchanging positions of the at least two flying platforms while surveying the emitters and the azimuth angle in which each emitter is being surveyed;

exchanging electronic properties of received emitter beams between the platforms including a measured frequency of the emitter beams that are intercepted, time differences between each instance of two sequential pulses of an intercepted pulse sequence, and a signal for classifying a sequence of time differences of a pulse sequence being surveyed; and determining an emitter location by using intersecting points at which the electronic properties of the intersecting emitter beams are identical from among a plurality of possible intersecting points arising from intersecting bearing lines obtained during said emitter surveying, further including the step of exchanging the pulse duration of the received pulse sequence of the emitter between said at least two platforms, wherein geometrical data and electronic characterizing data for the emitter signals, which are received from emitters that have become newly operational, are transferred with a first priority, and the data for emitters, which have already been surveyed, are transferred with a second priority lower than the first priority and providing an appropriate repetition rate, depending on the priority, for the transfer of the electronic characterizing data for the emitter signals during the exchange between said at least two platforms, and wherein frequency measurement windows, which are used by said at least two platforms to correlate the electronic properties, are synchronized between said at least two platforms, and surveying of the emitters takes place simultaneously in said at least two platforms.

3. A process for locating emitters in a radar frequency range, comprising:

providing at least two flying platforms each including at least one passive radio frequency sensor for determining emitter beam pulse sequences;

mutually exchanging positions of the at least two flying platforms while surveying the emitters and the azimuth angle in which each emitter is being surveyed;

exchanging electronic properties of received emitter beams between the platforms, including a measured frequency of the emitter beam that are intercepted, time differences between each instance of two sequential pulses of a pulse sequence that is intercepted, and a signal for classifying a sequence of time differences of a pulse sequence being surveyed; and determining an emitter location by using intersecting points at which the electronic properties of the intersecting emitter beams are identical from among a plurality of possible intersecting points arising from intersecting bearing lines obtained during said emitter surveying, further comprising the step of exchanging the measured frequency breadth or the minimal and maximal frequency values of the received pulse sequence of the emitter between said at least two platforms, wherein geometrical data and electronic characterizing data for the emitter signals, which are received from emitters that have become newly operational, are transferred with a first priority, and the data for emitters, which have already been surveyed, are transferred with a second priority lower than the first priority and providing an appropriate repetition rate, depending on the priority, for the transfer of the electronic characterizing data for the emitter signals during the exchange between said at least two platforms, and wherein frequency measurement windows, which are used by said at least two platforms, are synchronized between said at least two platforms to correlate the electronic properties, and surveying of the emitters takes place simultaneously in said at least two platforms.

\* \* \* \* \*